F. P. FLANAGAN.

HAT.

No. 7,691.

Reissued May 22, 1877.

Witnesses;

Geo. H. Graham.

John C. Kluber.

Inventor;

Francis P. Flanagan, by Munson & Philipp.

Attorneys.

N. PETERS, PHOTO-LITHOGRAPHER, WASHINGTON, D. C.

UNITED STATES PATENT OFFICE.

FRANCIS P. FLANAGAN, OF SPRINGFIELD, MASSACHUSETTS, ASSIGNOR TO JAMES W. COREY, OF NEWARK, NEW JERSEY.

IMPROVEMENT IN HATS.

Specification forming part of Letters Patent No. 38,895, dated June 16, 1863; Reissue No. 7,691, dated May 22, 1877; application filed May 1, 1877.

*To all whom it may concern:*

Be it known that I, FRANCIS P. FLANAGAN, formerly of the city of Newark, county of Essex, State of New Jersey, now of the city of Springfield, county of Hampden, and State of Massachusetts, have invented certain new and useful Improvements in the Manufacture of Hats; and I do hereby declare the following to be a full, clear, and exact description of the same, reference being made to the accompanying drawing, forming a part of this specification.

Figure 1:
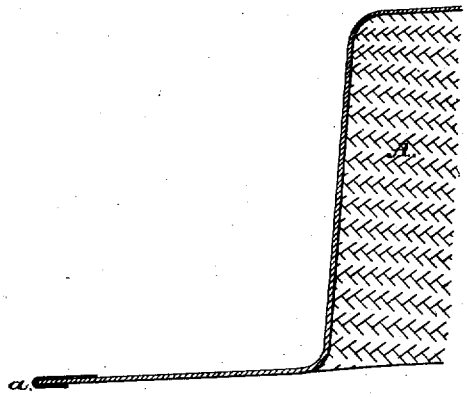
Figure 2:
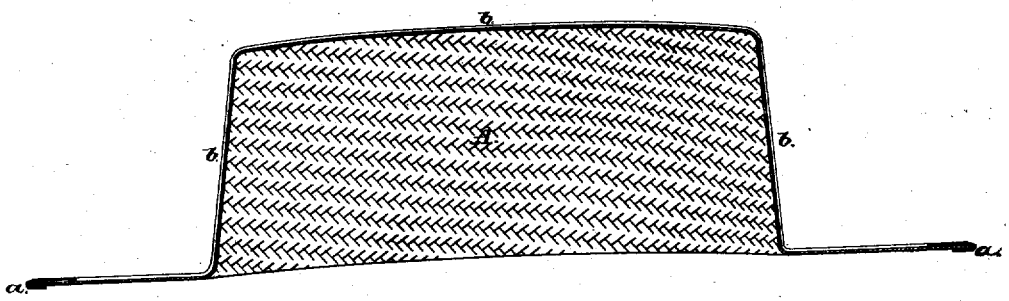

Figure 1 is a vertical section of a portion of a hat, the body of which is made of palm-leaf, showing a binding-strip applied to the edge of the brim. Fig. 2 is a vertical section of a hat, showing the hat-body provided with a covering.

Similar letters of reference indicate corresponding parts in both figures.

This invention relates to the manufacture of hats with bodies of palm-leaf or other material of similar character. It consists in cementing a binding of muslin or other suitable woven fabric around and over the edge of the brim, for the purpose of confining the ends of the strips of palm-leaf, or similar material of which the body is composed, and thereby insuring a smooth edge and giving greater firmness to the brim.

It also consists in coating the body with a solution of india-rubber preparatory to the application of the coating of varnish commonly known as "hatter's varnish," when the body is to be covered with felt, cloth, plush, or other woven fabric, so as to produce a more perfect union of the covering with the body.

This coating of india-rubber solution makes a more perfect adhesion of the varnish to the body, and prevents it from cracking off by the application to the hat of any pressure which indents and temporarily alters its shape.

In carrying out my invention, I take the body A, made of palm-leaf or other similar material, and, after blocking it, cut or trim the brim to the desired shape, and cement over its edge a binding-strip, *a*, of muslin or other woven fabric, with flour cement or other suitable adhesive material. This strip may be about half an inch in width, and I prefer to apply it so that the greater portion of its width is on the upper surface of the brim, leaving only a narrow margin to turn over the edge and lap the under surface thereof. This confines the ends of the strips of palm-leaf, or other similar material of which the body is composed, and thereby insures a smooth edge and gives firmness to the brim. The hat is then finished in the usual manner.

When the body is to be covered with felt, cloth, plush, or other woven material, I take the body A, and, after blocking it, pounce the exterior surface with pumice-stone or sand-paper, to give it a desirable grain or roughness to insure the adhesion to the rubber solution, and then cut or trim the brim to the desired shape. I then cement the binding-strip *a* over the edge of its brim, as above described, and then apply the india-rubber solution, with a suitable brush, all over the exterior of the body, or to such portion of it as is to be covered, and to the under surface of the brim also, if that is to be covered. This solution may be made by adding to a suitable quantity of india-rubber sufficient benzine, camphene, or other suitable solvent to reduce it to a fluid state.

When the coating has become set, I apply, in the usual manner, the coating of hatter's varnish. This is a varnish composed of lac and other gums dissolved in alcohol, and the mode of preparing and using it is well known to hatters.

The covering *b*, of felt, cloth, or plush, is then applied, and secured by ironing, in the same manner that cloth or plush is applied to other hat-bodies, and the hat is finished and trimmed in the usual manner.

When a covering of felt is used it is made very much thinner than a felt-hat body, as it is not required to add strength to the hat, but merely to produce a surface.

What I claim as my invention, and desire to secure by Letters Patent, is—

1. A hat-body made of strips of palm-leaf or other similar material, having the cut or trimmed edge of its brim covered with a binding-strip of muslin or other woven fabric, cemented thereto for the purpose of confining the ends of the strips of palm-leaf, or other similar material of which the body is composed, thereby insuring a smooth edge, and giving greater firmness to the brim, substantially as described.

2. The combination, with a coating of hatter's varnish to secure a covering of felt, cloth, plush, or other woven fabric, to a hat-body made of palm-leaf or other material of similar character, of a coating of india-rubber solution applied to the body preparatory to the application of the hatter's varnish, substantially as and for the purpose herein specified.

3. The binding-strip *a*, cemented over the edge of the brim preparatory to the application of, and in combination with, the covering *b*, substantially as and for the purpose herein specified.

In testimony whereof I have signed my name to this specification in the presence of two subscribing witnesses.

F. P. FLANAGAN.

Attest:
W. S. GREENE,
JAS. A. L'AMMEX.